United States Patent
Choi

(10) Patent No.: US 12,414,066 B2
(45) Date of Patent: Sep. 9, 2025

(54) ELECTRONIC DEVICE FOR PERFORMING MEDIUM SYNCHRONIZATION OF A LINK AND METHOD FOR THE SAME

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 464 days.

(21) Appl. No.: 17/873,631

(22) Filed: Jul. 26, 2022

(65) Prior Publication Data

US 2023/0017108 A1  Jan. 19, 2023

Related U.S. Application Data

(63) Continuation of application No. PCT/KR2022/008051, filed on Jun. 8, 2022.

(30) Foreign Application Priority Data

Jul. 19, 2021 (KR) .................. 10-2021-0094120

(51) Int. Cl.
*H04W 56/00* (2009.01)

(52) U.S. Cl.
CPC ..... *H04W 56/0045* (2013.01); *H04W 56/001* (2013.01)

(58) Field of Classification Search
CPC ............. H04W 76/25; H04W 56/0045; H04W 56/001; H04W 76/15; H04W 84/12;
(Continued)

(56) References Cited

U.S. PATENT DOCUMENTS

| 8,964,567 B2 | 2/2015 | Glozman et al. |
| 11,357,025 B2 | 6/2022 | Naribole et al. |

(Continued)

FOREIGN PATENT DOCUMENTS

| KR | 10-1934200 | 4/2019 |
| KR | 10-2021-0007897 | 1/2021 |

(Continued)

OTHER PUBLICATIONS

Search Report and Written opinion dated 2022-09-05 in counterpart International Patent Application No. PCT/ KR2022/008051.

(Continued)

*Primary Examiner* — Ji-Hae Yea
(74) *Attorney, Agent, or Firm* — Nixon & Vanderhye, P.C.

(57) ABSTRACT

In an electronic device and an operation method thereof according to various embodiments, the electronic device may include: at least one antenna; a communication circuit electrically connected to the antenna and configured to transmit and receive data through a first link and/or a second link established between an external electronic device and the electronic device; and a processor operably connected to the communication circuit, wherein the processor may be configured to: receive, in a state of transmitting data to the external electronic device through the first link, medium synchronization information of the second link through the first link; and perform synchronization of the second link based on the medium synchronization information.

16 Claims, 12 Drawing Sheets

(58) Field of Classification Search
CPC .......... H04W 88/06; H04L 69/28; H04L 9/40;
H04L 61/09; H04L 63/00; H04L 65/60;
H04L 65/61; H04L 65/611; H04L 65/612;
H04L 65/613; H04L 65/65; H04L 65/70;
H04L 65/75; H04L 65/752; H04L 65/756;
H04L 67/01; H04L 67/1001; H04L
67/10015; H04L 67/131; H04L 67/133;
H04L 67/1396; H04L 67/50
See application file for complete search history.

(56) References Cited

U.S. PATENT DOCUMENTS

| | | |
|---|---|---|
| 2021/0007168 A1 | 1/2021 | Asterjadhi et al. |
| 2021/0014811 A1 | 1/2021 | Seok et al. |
| 2021/0160941 A1 | 5/2021 | Patil et al. |
| 2021/0195540 A1 | 6/2021 | Fischer |
| 2021/0266965 A1* | 8/2021 | Ho .................. H04W 56/001 |
| 2022/0167444 A1* | 5/2022 | Jang ................ H04W 76/15 |
| 2022/0322473 A1 | 10/2022 | Hwang et al. |
| 2023/0059797 A1 | 2/2023 | Hong |
| 2023/0224996 A1* | 7/2023 | Kim .................. H04W 12/06 370/329 |
| 2024/0064561 A1* | 2/2024 | Dong ................ H04L 45/24 |

FOREIGN PATENT DOCUMENTS

| | | |
|---|---|---|
| KR | 10-2021-0031386 | 3/2021 |
| WO | 2021/002618 | 1/2021 |
| WO | 2021-138910 | 7/2021 |

OTHER PUBLICATIONS

Huang, Guogang et al., "Discussion on Multi-link Setup,", IEEE 802.11-20/1534r0, 2020-09-02, 20 pages.

Rison, Mark, "Review of P802.11be/D0.3 for CC34," IEEE 802.11-21/0218r0, 2021-02-03, 48 pages.

1 Extended Search Report dated 2024-10-29 in European Patent Application No. 22846039.0.

* cited by examiner

ELECTRONIC DEVICE FOR PERFORMING MEDIUM SYNCHRONIZATION OF A LINK AND METHOD FOR THE SAME

CROSS-REFERENCE TO RELATED APPLICATIONS

This application is a continuation of International Application No. PCT/KR2022/008051 designating the United States, filed on Jun. 8, 2022, in the Korean Intellectual Property Receiving Office and claiming priority to Korean Patent Application No. 10-2021-0094120, filed on Jul. 19, 2021, in the Korean Intellectual Property Office, the disclosures of which are incorporated by reference herein in their entireties.

BACKGROUND

Field

The disclosure relates to an electronic device and operation method thereof, and to a technique for performing medium synchronization of a link established between an external electronic device and the electronic device.

Description of Related Art

With the popularization of various electronic devices, speed improvement for wireless communication that can be used by various electronic devices has been achieved. Among wireless communications supported by recent electronic devices, IEEE 802.11 WLAN (or Wi-Fi) is a standard for implementing high-speed wireless connections between various electronic devices. The first implemented Wi-Fi could support a transmission rate of up to 1 to 9 Mbps, but Wi-Fi 6 technology (or IEEE 802.11ax) can support a transmission rate of up to about 10 Gbps.

Electronic devices may support various services utilizing relatively large amounts of data (e.g., a UHD video streaming service, an augmented reality (AR) service, a virtual reality (VR) service, a mixed reality (MR) service) through wireless communication supporting high transmission rates, and may support various other services.

It has been proposed that the IEEE 802.11 WLAN standard introduce a technology supporting multi-link operation (MLO) in order to improve data transmission and reception speed and reduce latency. An electronic device supporting multi-link operation may transmit or receive data through a plurality of links, and thus it is expected to achieve a relatively high transmission speed and a low delay time.

In a wireless LAN system, an electronic device may use a method of carrier sense multiple access with collision avoidance (CSMA/CA) to prevent a collision caused by transmitting data simultaneously through the same link as other electronic devices. The CSMA/CA method is a method of performing data transmission when a specific link is in idle state, and the electronic device supporting CSMA/CA may check whether another electronic device transmits data through a specific link and transmit data if the other electronic device does not transmit data through the specific link. An electronic device supporting multi-link operation may transmit data by using the CSMA/CA method for each of plural links.

Considering that interference may occur between links due to the limitation of the mounting space of an electronic device, the IEEE 802.11 WLAN standard considers support of a non-STA mode or an enhanced multi-link single radio (EMLSR) mode in which, when data is being transmitted to an external electronic device through one link, data is not received through another link.

To transmit data through a specific link, the electronic device may determine whether the specific link is in idle state. In response to determining that the specific link is in idle state, the electronic device may transmit data through the specific link. To determine whether a specific link is in idle state, the electronic device may perform medium synchronization of the specific link. Medium synchronization may refer to, for example, an operation of tracking the status of a specific link in order to determine whether the specific link is in an occupied state or how long the occupied state will be maintained. Medium synchronization may be performed based on data received through a link that is a target of the medium synchronization.

However, the electronic device operating in non-STR mode or EMLSR mode may be unable to receive data through a specific link while transmitting data through another link, in which case it may fail to receive information for medium synchronization of the specific link.

When the medium synchronization of a specific link is released, the electronic device may wait until data is received through the specific link or may be unable to perform data transmission until a specified time (e.g., timeout), which may increase the latency of data transmission.

SUMMARY

An electronic device according to various example embodiments of the disclosure may include: at least one antenna; a communication circuit electrically connected to the antenna and configured to transmit and receive data through a first link and a second link established between an external electronic device and the electronic device; and a processor operably connected to the communication circuit, wherein the processor may be configured to: receive, in a state of transmitting data to the external electronic device through the first link, medium synchronization information of the second link through the first link; and perform synchronization of the second link based on the medium synchronization information.

An electronic device according to various example embodiments of the disclosure may include: at least one antenna; a communication circuit electrically connected to the antenna and configured to transmit and receive data through a first link and a second link established between an external electronic device and the electronic device; and a processor operably connected to the communication circuit, wherein the processor may be configured to: generate, in a state of receiving data from the external electronic device through the first link, medium synchronization information of the second link; and control, upon completion of reception of the data, the communication circuit to transmit the medium synchronization information of the second link to the external electronic device through the first link, and wherein the medium synchronization information may include information about a timer for medium synchronization of the second link.

A method of operating an electronic device according to various example embodiments of the disclosure may include: receiving, in a state of transmitting data through a first link established between an external electronic device and the electronic device, medium synchronization information of a second link; and performing synchronization of the second link based on the medium synchronization information.

The electronic device and operation method thereof according to various example embodiments of the disclosure can receive medium synchronization information of a second link through a first link while transmitting data through the first link, and perform or maintain medium synchronization of the second link based on the medium synchronization information of the second link. Accordingly, even if the electronic device operates in non-STR mode or EMLSR mode, it can perform data transmission rapidly through the second link, so that data transmission speed can be improved and latency can be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
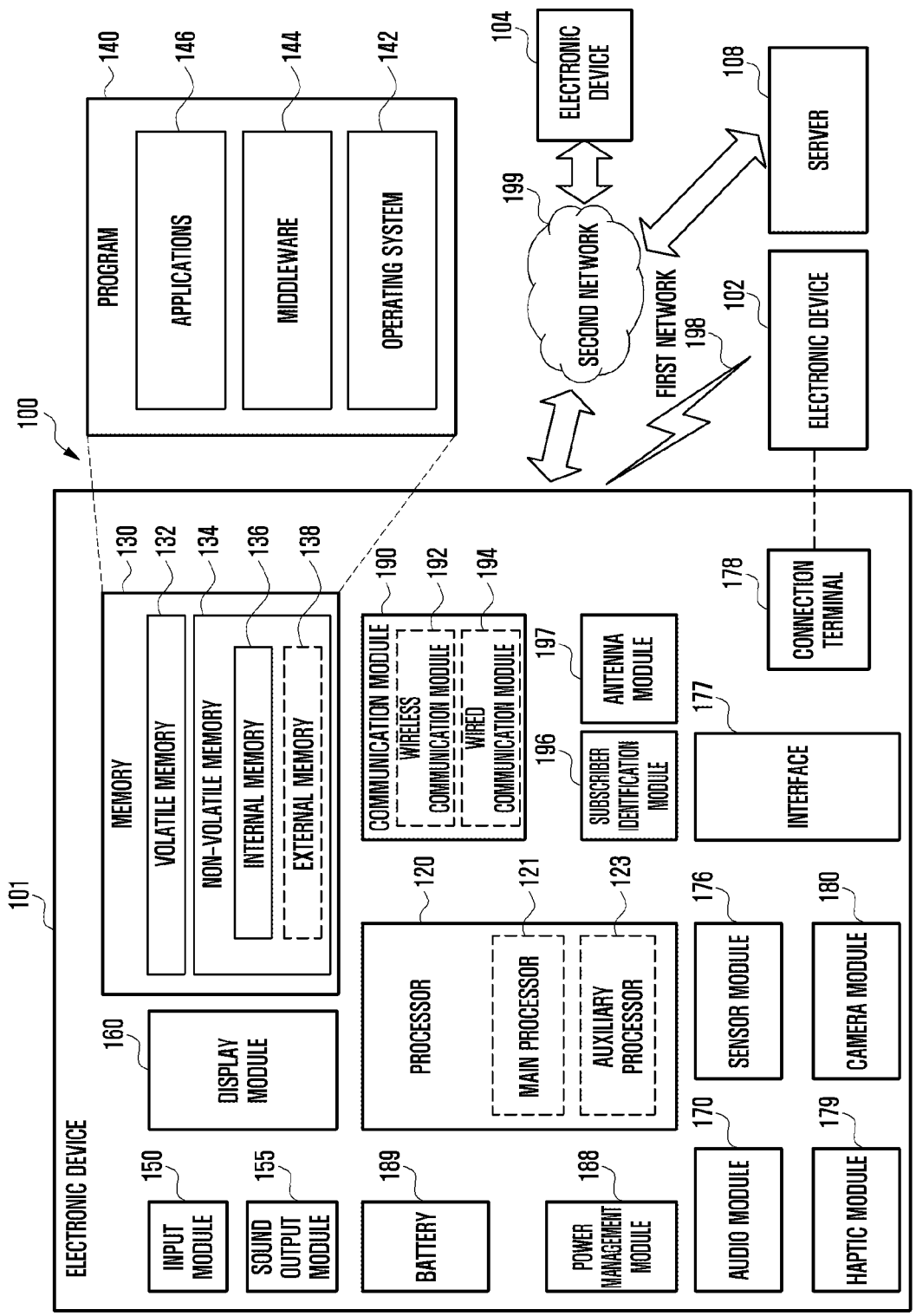
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
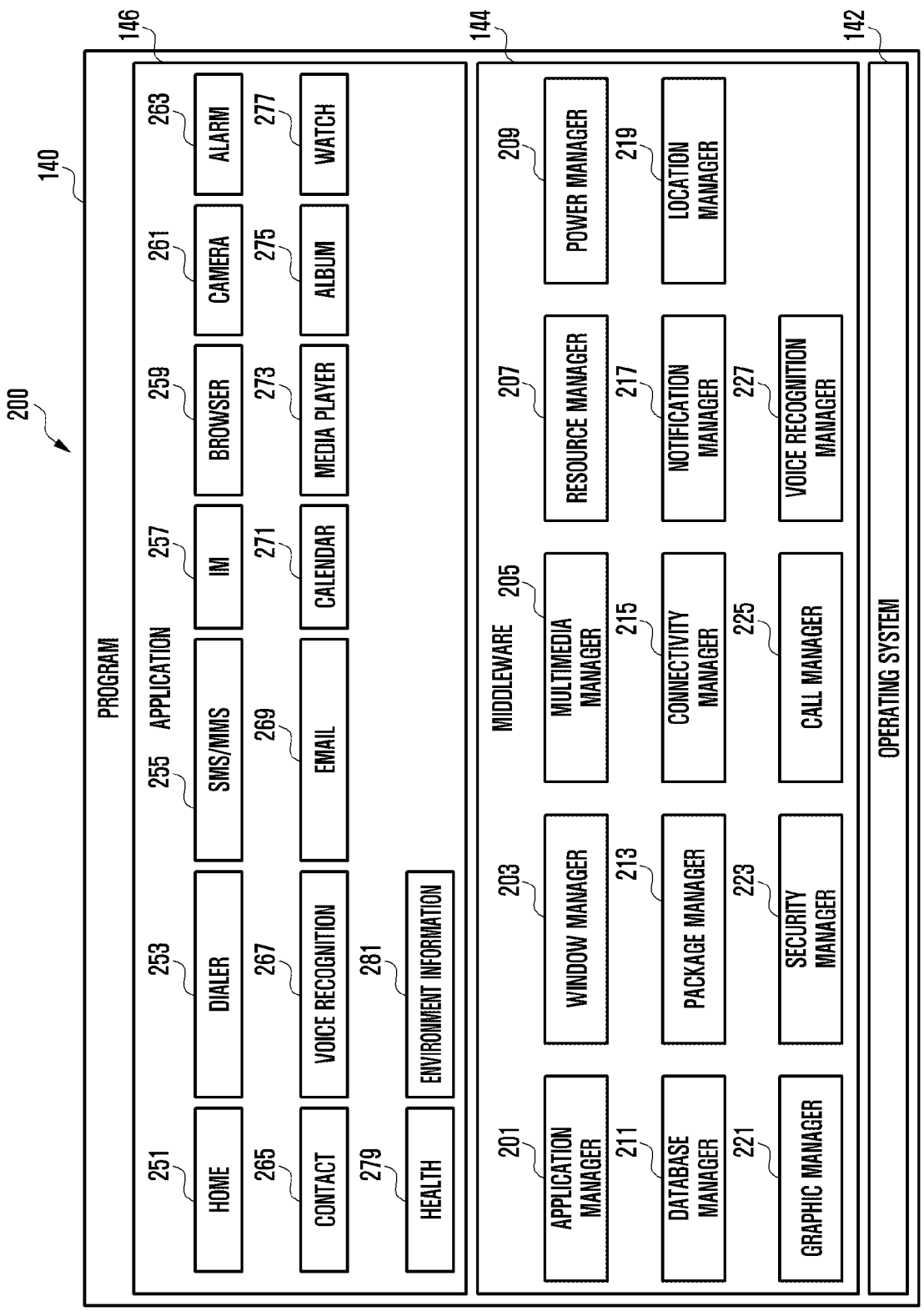
FIG. 2 is a block diagram illustrating an example configuration of programs according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony (call) manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony (call) manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
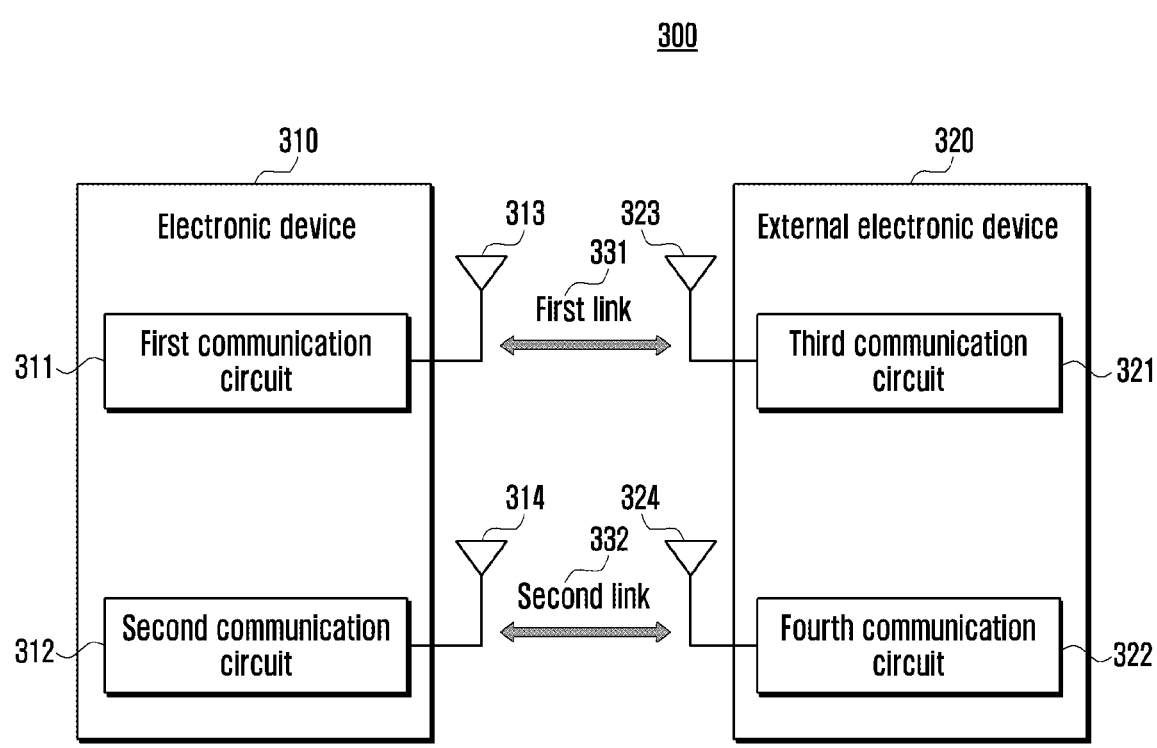
FIG. 3 is a diagram illustrating an example in which an electronic device and an access point (AP) operate in multi-link operation (MLO) according to various embodiments.

FIG. 3 is a diagram illustrating an embodiment in which an electronic device and an external electronic device (e.g., access point (AP)) operate in multi-link operation (MLO) according to various embodiments of the disclosure.

With reference to FIG. 3, the wireless LAN system 300 may include an electronic device 310 and/or an external electronic device 320. According to an embodiment, the electronic device 310 may perform wireless communication with the external electronic device 320 through short-range wireless communication. Wireless communication may refer to various communication methods that both the electronic device 310 and/or the external electronic device 320 can support. For example, wireless communication may be Wi-Fi. The external electronic device 320 may serve as a base station that provides wireless communication to at least one electronic device 310 located inside the communication radius of the wireless LAN system 300. For example, the external electronic device 320 may include an access point (AP) of IEEE 802.11. The electronic device 310 may include a station (STA) of IEEE 802.11.

According to various embodiments of the disclosure, the electronic device 310 and/or the external electronic device 320 may support multi-link operation (MLO). The multi-link operation may be an operation mode in which data is transmitted or received through plural links (e.g., first link 331 and second link 332). The multi-link operation is an operation mode to be introduced in IEEE 802.11be, and may be an operation mode in which data is transmitted or received through plural links based on plural bands or channels.

According to various embodiments of the disclosure, the electronic device 310 may include a plurality of communication circuits (e.g., first communication circuit 311 and/or second communication circuit 312) to support multi-link operation. The first communication circuit 311 may transmit data to the external electronic device 320 through a first link 331 or receive data transmitted by the external electronic device 320 through the first link 331. The first communication circuit 311 may output or receive a signal of a frequency band corresponding to the first link 331 through a first antenna 313. The second communication circuit 312 may transmit data to the external electronic device 320 through a second link 332 or receive data transmitted by the external electronic device 320 through the second link 332. The second communication circuit 312 may output or receive a signal of a frequency band corresponding to the second link 332 through a second antenna 314.

According to various embodiments of the disclosure, the external electronic device 320 may include a plurality of communication circuits (e.g., third communication circuit 321 and/or fourth communication circuit 322) to support multi-link operation. The third communication circuit 321 may transmit data to the electronic device 310 through the first link 331 or receive data transmitted by the electronic device 310 through the first link 331. The third communication circuit 321 may output or receive a signal of a frequency band corresponding to the first link 331 through a third antenna 323. The fourth communication circuit 322 may transmit data to the electronic device 310 through the second link 332 or receive data transmitted by the electronic device 310 through the second link 332. The fourth communication circuit 322 may output or receive a signal of a frequency band corresponding to the second link 332 through a fourth antenna 324.

According to various embodiments of the disclosure, the frequency band of the first link 331 and the frequency band of the second link 333 may be different from each other. For example, the frequency band of the first link 331 may be 2.5 GHz, and the frequency band of the second link 332 may be 5 GHz or 6 GHz.

According to various embodiments of the disclosure, a different electronic device other than the electronic device 310 may also use the first link 331 and the second link 332. To prevent a situation in which the electronic device 310 and another electronic device transmit or receive data through the same link at the same time, the electronic device 310 may support a carrier sense multiple access with collision avoidance (CSMA/CA) method. The CSMA/CA method may, for example, refer to a scheme for performing data transmission when a specific link is in idle state. The electronic device 310 supporting CSMA/CA may check whether another electronic device transmits data through a specific link, and, upon sensing data transmission, may wait without transmitting data through the specific link. Upon confirming that another electronic device does not transmit data through the specific link, the electronic device 310 supporting CSMA/CA may transmit data through the specific link according to a specified scheme (e.g., activating a timer and transmitting data when the timer expires). In this way, the electronic device 310 may perform data transmission and/or reception through a specific link without colliding with another electronic device.

According to various embodiments of the disclosure, the first link 331 and/or the second link 332 supported by the multi-link operation may independently support CSMA/CA.

Figure 4A:
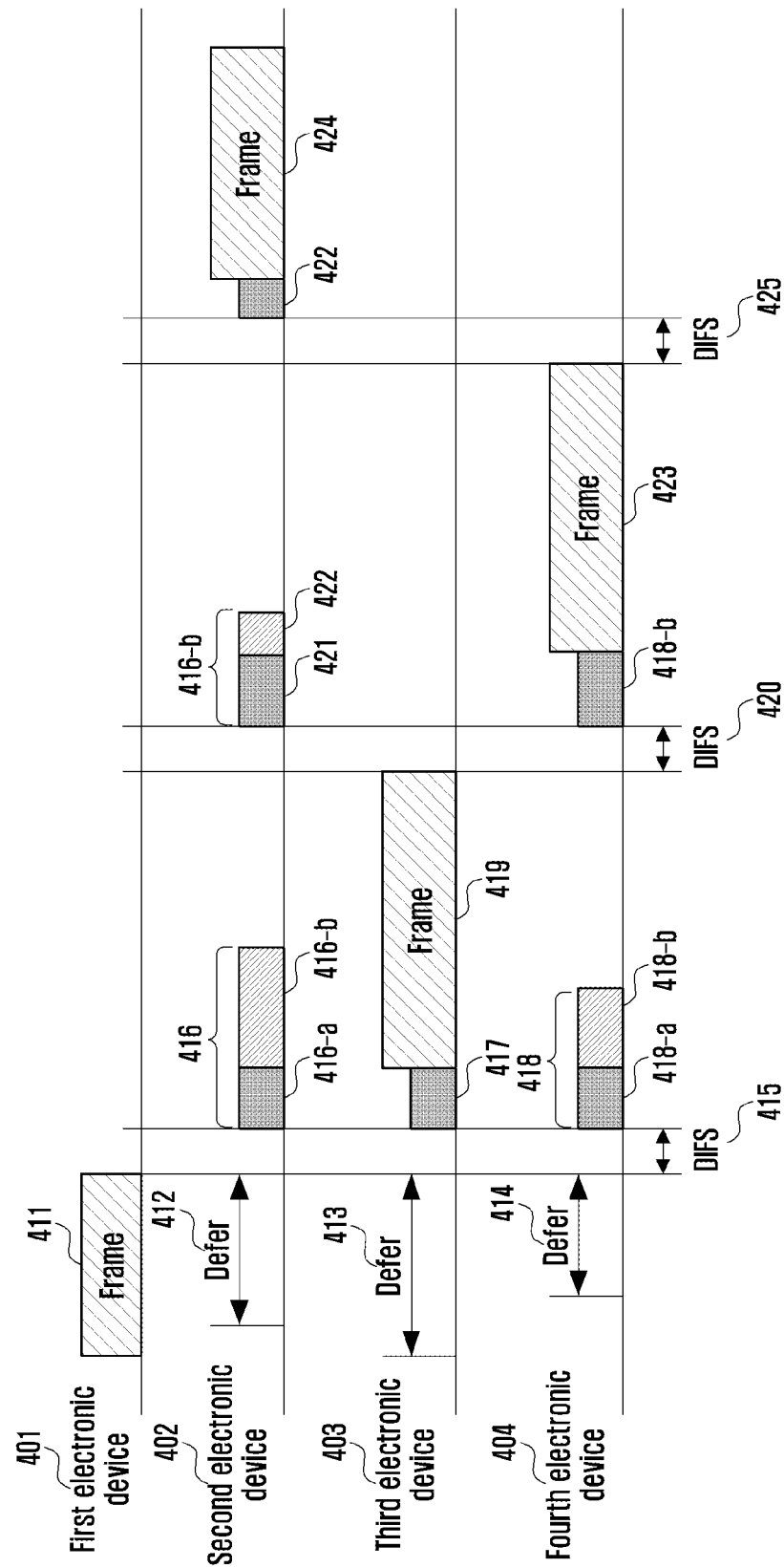
FIG. 4A is a diagram illustrating an example in which electronic devices perform medium synchronization of a link according to various embodiments.

FIG. 4A is a diagram illustrating an example in which electronic devices perform medium synchronization of a link according to various embodiments.

FIG. 4A shows an embodiment in which a first electronic device 401 (e.g., electronic device 310 in FIG. 3), a second electronic device 402 (e.g., electronic device 310 in FIG. 3), a third electronic device 403 (e.g., electronic device 310 in FIG. 3), and/or a fourth electronic device 404 (e.g., electronic device 310 in FIG. 3) transmit data to an external electronic device 320 using the same link (e.g., second link 332 in FIG. 3).

According to various embodiments of the disclosure, the first electronic device 401, the second electronic device 402, the third electronic device 403, and/or the fourth electronic device 404 may transmit data through the CSMA/CA scheme. The first electronic device 401, the second electronic device 402, the third electronic device 403, and/or the fourth electronic device 404 may perform medium synchronization of the second link 332 before performing data transmission. Medium synchronization of the second link 332 may, for example, refer to a situation in which the state of the second link 332 can be updated in real time. Medium synchronization of the second link 332 may be performed by using a portion of data (e.g., header of data) transmitted through the second link 332.

The first electronic device 401 supporting CSMA/CA may check whether a specific link is in idle state before transmitting data 411. The first electronic device 401 may identify whether the second link 332 is in an idle state based on information related to the idle state of the second link 332 included in data transmitted by the external electronic device 320. The information related to the idle state of the second link 332 may include a CCA status field (clear channel assessment field) and/or a network allocation vector (NAV) configuration field. The information related to the idle state of the second link 332 may be included in a ready to send (RTS) message for requesting data transmission through the second link 332, or in a clear to send (CTS) message indicating that data transmission is possible through the second link 332. The first electronic device 401 may identify whether a specific link is in an idle state by referring to the CCA status field and/or the NAV configuration field. The first electronic device 401 may determine whether the second link 332 is physically idle by referring to the CCA status field, and determine whether the second link 332 is logically idle by referring to the NAV configuration field. In response to confirming that a specific link is in an idle state, the first electronic device 401 may activate a timer, and may transmit data 411 to the external electronic device 320 through the second link 332 in response to expiration of the timer after a specified time.

While the first electronic device 401 is transmitting the data 411, the second electronic device 402, the third electronic device 403, and/or the fourth electronic device 404, which support CSMA/CA, may wait without transmitting other data (412, 413, 414, respectively). The second electronic device 402, the third electronic device 403 and/or the fourth electronic device 404 may determine the end time of transmission of the data 411 based on a portion of the data 411 transmitted through the second link 332 (e.g., rate field and/or length field included in the PHY header, and duration field included in the MAC header), and may wait a specific time 415 based on the end of transmission of the data 411. The specific time 415 may means a DIFS (distributed inter frame space).

The second electronic device 402, the third electronic device 403, and/or the fourth electronic device 404 may activate timers after the specific time 415 elapses, and may transmit data to the external electronic device 320 through the second link 332 in response to expiration of the timers. The lengths of the timers set in the second electronic device 402, the third electronic device 403, and/or the fourth electronic device 404 may be different from each other. According to an embodiment, the second electronic device 402, the third electronic device 403, and/or the fourth electronic device 404 may use randomly set timers to check whether the timers expire and transmit data when the timers expire.

With reference to FIG. 4A, the second electronic device 402 may activate a timer set to a first period 416, the third electronic device 403 may activate a timer set to a second period 417, and the fourth electronic device 404 may activate a timer set to a third period 418. The first period 416, the second period 417, and/or the third period 418 may be different from each other. In FIG. 4A, the first period 416 may be longer than the third period 418, and the third period 418 may be longer than the second period 417.

According to various embodiments of the disclosure, in response to confirming that the third period 417 has expired, the third electronic device 403 may transmit data 419 to the external electronic device 320 through the second link 332. The second electronic device 402 and/or the fourth electronic device 404 may wait without transmitting other data while the third electronic device 403 is transmitting the data 419. The second electronic device 402 may store the remaining period 416-b obtained by subtracting the elapsed period 416-a from the first period 416, and the fourth electronic device 404 may store the remaining period 418-b obtained by subtracting the elapsed period 418-a from the third period 418. The second electronic device 402 and the fourth electronic device 404 may determine the end time of transmission of the data 419 based on a portion of the data 419 transmitted through the second link 332 (e.g., rate field and/or length field included in the PHY header, and duration field included in the MAC header), and may wait a specific time 420 based on the end of transmission of the data 419. The specific time 420 may refer to a DIFS (distributed inter frame space).

The second electronic device 402 and/or the fourth electronic device 404 may activate the timers again after the specific time 420 has elapsed. In response to confirming that the remaining period 418-b has expired, the fourth electronic device 404 may transmit the data 423 to the external electronic device 320 through the second link 332. The second electronic device 402 may sense that the fourth electronic device 404 transmits the data 423 before the remaining period 416-b expires and deactivate the timer again. The second electronic device 420 may store the remaining period 422 obtained by subtracting the elapsed period 421 from the remaining period 416-b. The second electronic device 402 may determine the end time of transmission of the data 423 based on a portion of the data 423 transmitted through the second link 332 (e.g., rate field and/or length field included in the PHY header, and duration field included in the MAC header), and may wait a specific time 425 based on the end of transmission of the data 423. The specific time 425 may means a DIFS (distributed inter frame space).

The second electronic device 402 may activate the timer again after the specific time 425 has elapsed. In response to confirming that the remaining period 422 has expired, the fourth electronic device 404 may transmit the data 424 to the external electronic device 320 through the second link 332.

In a manner described above, the first electronic device 401, the second electronic device 402, the third electronic device 403, and/or the fourth electronic device 404 may perform medium synchronization of the second link 332.

Through the method shown in FIG. 4A, the first electronic device 401, the second electronic device 402, the third electronic device 403, and/or the fourth electronic device 404, which support CSMA/CA, may transmit data through the second link 332 to the external electronic device 320 without collision. For the CSMA/CA scheme to operate smoothly, the first electronic device 401, the second electronic device 402, the third electronic device 403, and/or the fourth electronic device 404 must always be able to receive data transmitted through the second link 332.

Figure 4B:
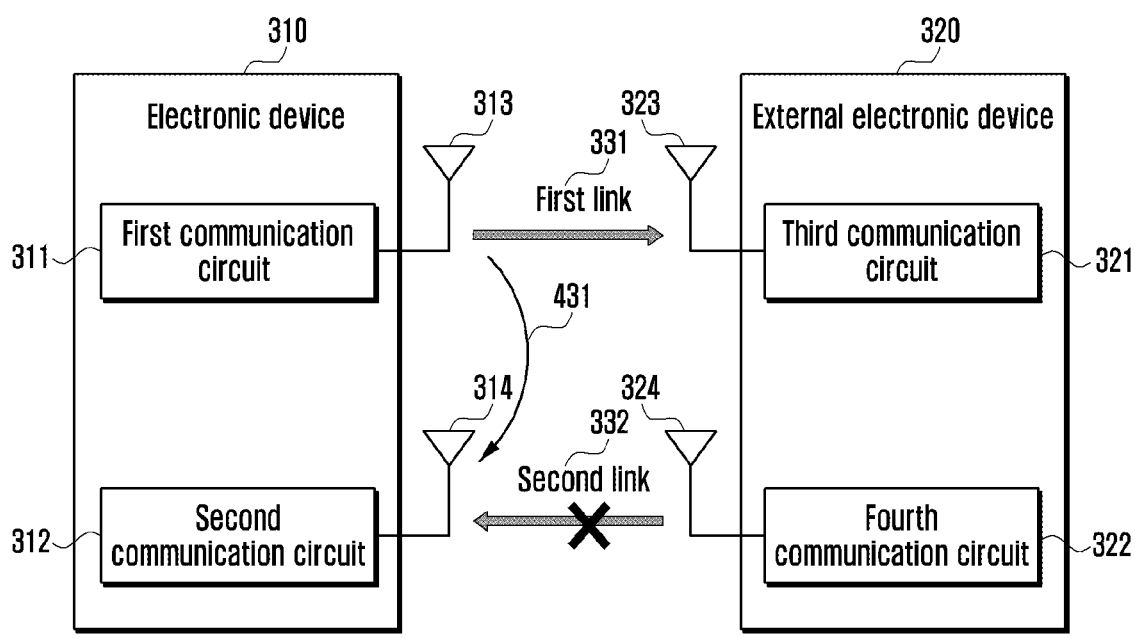
FIG. 4B is a diagram illustrating an example in which the electronic device operates in non-simultaneous transmission and reception (non-STR) mode according to various embodiments.

FIG. 4B is a diagram illustrating an example in which the electronic device operates in non-simultaneous transmission and reception (non-STR) mode according to various embodiments.

With reference to FIG. 4B, the wireless LAN system 300 may include an electronic device 310 and/or an external electronic device 320. According to an embodiment, the electronic device 310 may perform wireless communication with the external electronic device 320 through short-range wireless communication. The wireless communication may refer to various communication methods that both the electronic device 310 and/or the external electronic device 320 can support. For example, the wireless communication may be Wi-Fi. The external electronic device 320 may serve as a base station that provides wireless communication to at least one electronic device 310 located within the communication radius of the wireless LAN system 300. For example, the external electronic device 320 may include an access point (AP) of IEEE 802.11. The electronic device 310 may include a station (STA) of IEEE 802.11.

According to various embodiments of the disclosure, the electronic device 310 and/or the external electronic device 320 may support multi-link operation (MLO). Multi-link operation may, for example, refer to an operation mode in which data is transmitted or received through a plurality of links (e.g., first link 331 and second link 332). Multi-link operation is an operation mode to be introduced in IEEE 802.11be, and may be an operation mode in which data is transmitted or received through plural links based on plural bands or channels.

According to various embodiments of the disclosure, the electronic device 310 may include a plurality of communication circuits (e.g., first communication circuit 311 and/or second communication circuit 312) to support multi-link operation. The first communication circuit 311 may transmit data to the external electronic device 320 through a first link 331 or receive data transmitted by the external electronic device 320 through the first link 331. The first communication circuit 311 may output or receive a signal of a frequency band corresponding to the first link 331 through a first antenna 313. The second communication circuit 312 may transmit data to the external electronic device 320 through a second link 332 or receive data transmitted by the external electronic device 320 through the second link 332. The second communication circuit 312 may output or receive a signal of a frequency band corresponding to the second link 332 through a second antenna 314.

According to various embodiments of the disclosure, the external electronic device 320 may include a plurality of communication circuits (e.g., third communication circuit 321 and/or fourth communication circuit 322) to support multi-link operation. The third communication circuit 321 may transmit data to the electronic device 310 through the first link 331 or receive data transmitted by the electronic device 310 through the first link 331. The third communication circuit 321 may output or receive a signal of a frequency band corresponding to the first link 331 through a third antenna 323. The fourth communication circuit 322 may transmit data to the electronic device 310 through the second link 332 or receive data transmitted by the electronic device 310 through the second link 332. The fourth communication circuit 322 may output or receive a signal of a frequency band corresponding to the second link 332 through a fourth antenna 324.

According to various embodiments of the disclosure, the frequency band of the first link 331 and the frequency band of the second link 333 may be different from each other. For example, the frequency band of the first link 331 may be 2.5 GHz, and the frequency band of the second link 332 may be 5 GHz.

According to various embodiments of the disclosure, the electronic device 310 may fail to sufficiently secure a space 431 between the first antenna 313 and the second antenna 314 due to implementation reasons. According to an embodiment, if the space 431 between the first antenna 313 and the second antenna 314 is not sufficiently secured, a signal output by the first antenna 313 and a signal received by the second antenna 314 may interfere with each other. For example, the second antenna 314 may receive a signal resulting from a combination of the signal received through the second link 332 and a part of the signal output by the first antenna 313, so that the quality of the signal received through the second link 332 may be degraded.

According to various embodiments of the disclosure, the electronic device 310 may support non-simultaneous transmission and reception (non-STR) mode to prevent a situation in which the signal output by the first antenna 313 and the signal received by the second antenna 314 interfere with each other. The non-STR mode may refer to a mode in which the electronic device 310 does not receive data through the second link 332 when it transmits data to the external electronic device 320 through the first link 331. The non-STR mode may support an operation of receiving data through the second link 332 while receiving data through the first link 331 and/or transmitting data through the second link 332 while transmitting data through the first link 331.

According to various embodiments of the disclosure, when the electronic device 310 operating in non-STR mode transmits data to the external electronic device 320 through the first link 331, it may not receive data through the second link 332. As the electronic device 310 fails to receive data through the second link 332, it may be in a situation where medium synchronization of the second link 332 that may be performed using a portion of data cannot be performed. In this case, the electronic device 310 cannot identify whether another electronic device (e.g., second electronic device 402, third electronic device 403 and/or fourth electronic device 404) transmits data through the second link 332; and, to transmit data through the second link 332, the electronic device 310 activates the timer again after a specified time (e.g., time out) expires, and transmits data after the timer expires, so that the latency of data transmission may increase.

Figure 4C:
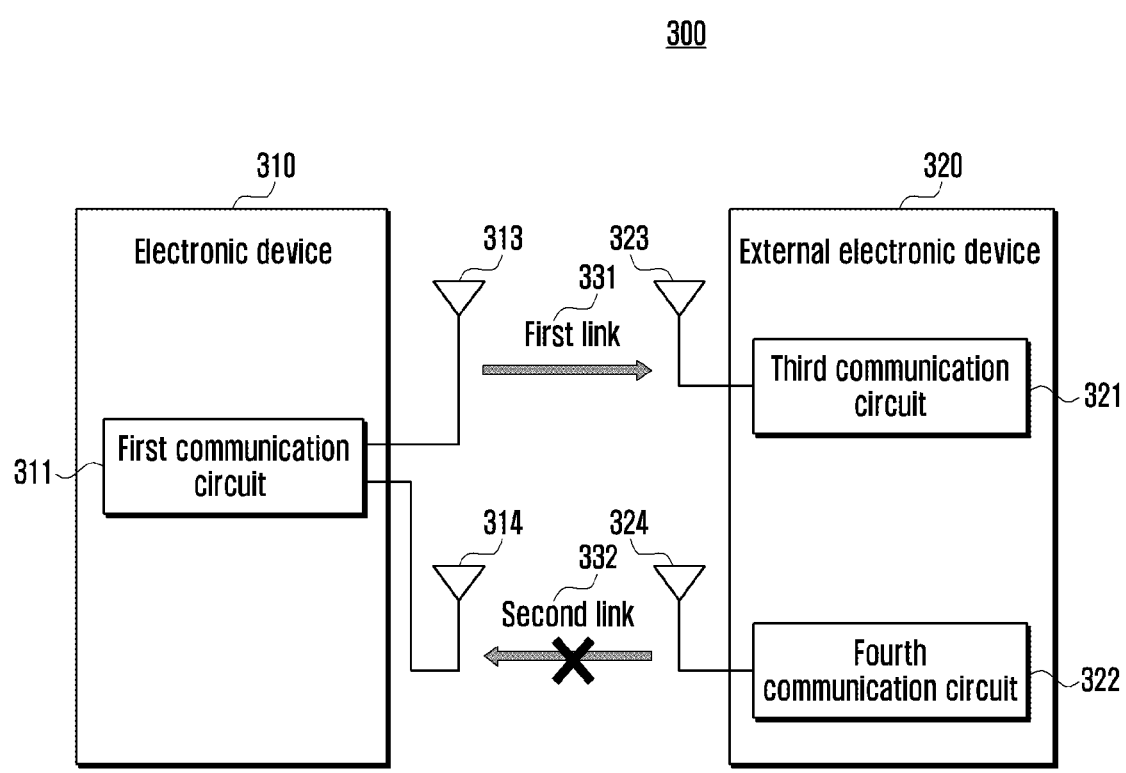
FIG. 4C is a diagram illustrating an example in which the electronic device operates in enhanced multi-link with single radio (EMLSR) mode according to various embodiments.

FIG. 4C is a diagram illustrating an example in which the electronic device operates in enhanced multi-link with single radio (EMLSR) mode according to various embodiments of the disclosure.

With reference to FIG. 4C, the wireless LAN system 300 may include an electronic device 310 and/or an external electronic device 320. According to an embodiment, the electronic device 310 may perform wireless communication with the external electronic device 320 through short-range wireless communication. The wireless communication may refer to various communication methods that both the electronic device 310 and/or the external electronic device 320 can support. For example, the wireless communication may be Wi-Fi. The external electronic device 320 may serve as a base station that provides wireless communication to at least one electronic device 310 located within the communication radius of the wireless LAN system 300. For example, the external electronic device 320 may include an access point (AP) of IEEE 802.11. The electronic device 310 may include a station (STA) of IEEE 802.11.

According to various embodiments of the disclosure, the electronic device 310 and/or the external electronic device 320 may support multi-link operation (MLO). Multi-link operation may be an operation mode in which data is transmitted or received through a plurality of links (e.g., first link 331 and second link 332). Multi-link operation is an operation mode to be introduced in IEEE 802.11be, and may be an operation mode in which data is transmitted or received through plural links based on plural bands or channels.

According to various embodiments of the disclosure, the electronic device 310 may include a first communication circuit 311 to support multi-link operation. The first communication circuit 311 may transmit data to the external electronic device 320 through a first link 331 or receive data transmitted by the external electronic device 320 through the first link 331. The first communication circuit 311 may transmit data to the external electronic device 320 through a second link 332 or receive data transmitted by the external electronic device 320 through the second link 332. The first communication circuit 311 may output or receive a signal of a frequency band corresponding to the first link 331 through a first antenna 313, and may output or receive a signal of a frequency band corresponding to the second link 332 through a second antenna 314.

According to various embodiments of the disclosure, the external electronic device 320 may include a plurality of communication circuits (e.g., third communication circuit 321 and/or fourth communication circuit 322) to support multi-link operation. The third communication circuit 321 may transmit data to the electronic device 310 through the first link 331 or receive data transmitted by the electronic device 310 through the first link 331. The third communication circuit 321 may output or receive a signal of a frequency band corresponding to the first link 331 through a third antenna 323. The fourth communication circuit 322 may transmit data to the electronic device 310 through the second link 332 or receive data transmitted by the electronic device 310 through the second link 332. The fourth communication circuit 322 may output or receive a signal of a frequency band corresponding to the second link 332 through a fourth antenna 324.

According to various embodiments of the disclosure, the frequency band of the first link 331 and the frequency band of the second link 333 may be different from each other. For example, the frequency band of the first link 331 may be 2.5 GHz, and the frequency band of the second link 332 may be 5 GHz.

According to various embodiments of the disclosure, the electronic device 310 may support multi-link operation using plural links through a single communication circuit (e.g., first communication circuit 311) for implementation reasons. In this case, the electronic device 310 may perform enhanced multi-link single radio (EMLSR) mode in which data having a relatively small size (e.g., control data, RTS frame, CTS frame, ACK message) is transmitted through plural links (e.g., first link 331, second link 332), but data having a relatively large size is transmitted through a single link (e.g., first link 331). The EMLSR mode may refer to a mode in which data having a relatively small size is transmitted and received by using plural links, and data having a relatively large size is transmitted and received by using a single link. When the electronic device 310 operating in EMLSR mode transmits relatively large data to the external electronic device 320 through the first link 331, it may fail to receive data through the second link 333.

As the electronic device 310 fails to receive data through the second link 332, a situation may occur in which medium synchronization of the second link 332 that can be performed using a portion of data cannot be performed. In this case, the electronic device 310 cannot identify whether another electronic device (e.g., second electronic device 402, third electronic device 403 and/or fourth electronic device 404 in FIG. 4A) transmits data through the second link 332; and, to transmit data through the second link 332, the electronic device 310 activates the timer again after a specified time (e.g., time out) expires, and transmits data after the timer expires, so that the latency of data transmission may increase.

Hereinafter, a description will be given of an embodiment in which an electronic device performs medium synchronization of a second link even when data cannot be received through the second link.

Figure 5:
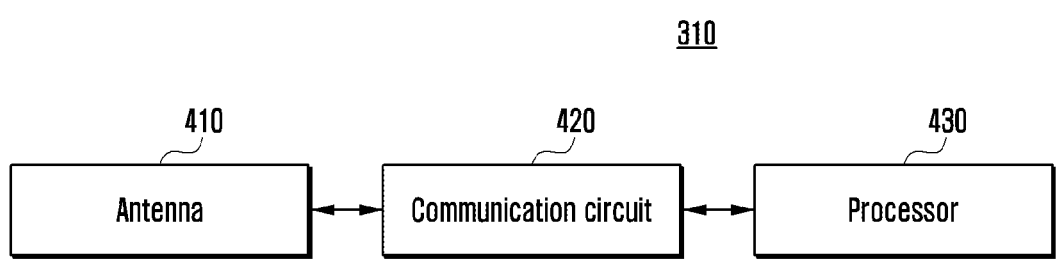
FIG. 5 is a block diagram illustrating an example configuration of an electronic device according to various embodiments.

FIG. 5 is a block diagram illustrating an example configuration of an electronic device according to various embodiments of the disclosure.

According to various embodiments of the disclosure, the electronic device (e.g., electronic device 310 in FIG. 3) may include an antenna 410, a communication circuit 420 (e.g., first communication circuit 311 or second communication circuit 312 in FIG. 3), and/or a processor 430 (e.g., processor 120 in FIG. 1).

According to various embodiments of the disclosure, the antenna 410 may receive a signal transmitted by an external electronic device (e.g., external electronic device 320 in FIG. 3) or transmit a signal to the external electronic device 320. When MLO is supported, the antenna 410 may transmit or receive a signal of a frequency band corresponding to the first link (e.g., first link 331 in FIG. 3), and may transmit or receive a signal of a frequency band corresponding to the second link (e.g., second link 332 in FIG. 3). The antenna 410 may include plural antennas.

The communication circuit 420 may transmit data to the external electronic device 320 through the first link 331 or receive data transmitted by the external electronic device 320 through the first link 331. The communication circuit 420 may transmit data to the external electronic device 320 through the second link 332 or receive data transmitted by the external electronic device 320 through the second link 332. The communication circuit 420 may output or receive a signal of a frequency band corresponding to the first link 331 through the antenna 410, and may output or receive a signal of a frequency band corresponding to the second link 332 through the antenna 410.

The processor 430 may be operably connected to the communication circuit 420 and control the operation of the communication circuit 420.

The processor 430 may identify whether the first link 331 is in an idle state to transmit data through the first link 331. The processor 430 may identify whether the first link 331 is in idle state by referring to the clear channel assessment (CCA) field and/or the network allocation vector (NAV) configuration field of data transmitted through the first link 331. Specifically, the processor 430 may determine whether the first link 331 is physically idle by referring to the CCA status field, and determine whether the first link 331 is logically idle by referring to the NAV configuration field. Upon determining that the first link 331 is in an idle state, the processor 430 may activate a first timer for transmission of the first link 331. The first timer may be a timer used for medium synchronization of the first link 331. When the first timer for transmission of the first link 331 expires, the processor 430 may control the communication circuit 420 to transmit data to the external electronic device 320 through the first link 331.

The processor 430 may identify whether the second link 332 is in an idle state to transmit data through the second link 332. The processor 430 may determine whether the second link 332 is in an idle state by using information related to the idle state of the second link 332 included in data transmitted through the second link 332. The information related to the idle state of the second link 332 may include a clear channel assessment (CCA) field and/or a network allocation vector (NAV) configuration field.

The processor 430 may identify whether the second link 332 is in an idle state by referring to the CCA status field and/or the NAV configuration field of data transmitted through the second link 332. Specifically, the processor 430 may determine whether the second link 332 is physically idle by referring to the CCA status field, and determine whether the second link 332 is logically idle by referring to the NAV configuration field. Upon determining that the second link 332 is in an idle state, the processor 430 may activate a second timer for transmission of the second link 332. When the second timer for transmission of the second link 332 expires, the processor 430 may control the communication circuit 420 to transmit data to the external electronic device 320 through the second link 332.

For implementation reasons, the processor 430 may control the communication circuit 420 to transmit data to the external electronic device 320 by using a specific mode among the modes supported by multi-link operation. The specific mode may be one of non-STR mode and EMLSR mode as a mode in which reception of data through the second link 332 is not allowed while data is transmitted to the external electronic device 320 through the first link 331. The processor 430 may transmit information indicating operating in specific mode to the external electronic device 320 through the first link 331.

While operating in specific mode, the processor 430 may store information on the second timer used for data transmission through the second link 332 in the memory (e.g., memory 130 in FIG. 1). The information on the second timer may include the remaining time of the second timer (e.g., similar to remaining time 416-*b* in FIG. 4A) for checking whether a specified time has expired. As operating in specific mode, the processor 430 may store information related to the idle state of the second link 332 (e.g., CCA status or NAV configuration) in the memory 130.

When it is not possible to receive data through the second link 332, the processor 430 may fail to perform medium synchronization of the second link 332 by using a portion of data received through the second link 332. To perform medium synchronization of the second link 332, the processor 430 may refer to a field (e.g., CCA or NAV configuration) included in a portion of data transmitted through the second link 332. Since the processor 430 cannot receive data through the second link 332, it cannot refer to the field included in a portion of data transmitted through the second link 332, so that the medium synchronization of the second link 332 may be in released state. When the medium synchronization of the second link 332 is in released state, the electronic device 310 may be not able to identify whether the second link 332 is in an idle state or identify the time point at which data can be transmitted through the second link 332.

According to an embodiment, the processor 430 may receive medium synchronization information of the second link 320 for performing medium synchronization of the second link 332 from the external electronic device 320 through the first link 331. The medium synchronization information may include information about a timer used for transmission of data through the second link 332. The information about the second timer may include information for changing the remaining time of the timer and/or information related to the idle state of the second link 332.

According to an embodiment, the processor 430 may perform (or, maintain) medium synchronization of the second link 332 based on the medium synchronization information received through the first link 331. Performing medium synchronization of the second link 332 may include changing the remaining time of the second timer used for data transmission through the second link 332, or setting a restart time of the second timer.

According to an embodiment, the processor 430 may identify a time value indicated by the information for changing the remaining time of the second timer included in the medium synchronization information, and change the remaining time of the second timer by subtracting the time value included in the medium synchronization information from the remaining time of the second timer stored in the memory 130.

The time value included in the medium synchronization information may, for example, refer to a period during which the second link 332 is in an idle state between the time point when the external electronic device 320 receives data through the first link 331 and the time point when the external electronic device 320 transmits medium synchronization information to the electronic device 310 through the first link 331. When the second link 332 is in an idle state, the remaining time of the timer used for data transmission through the second link 332 should decrease, but the remaining time of the second timer may be maintained in a state in which data cannot be received through the second link 332. The processor 430 may change the remaining time of the second timer by subtracting the time value included in the medium synchronization information from the remaining time of the second timer stored in the memory 130, and may perform (or, maintain) medium synchronization of the second link 332 in a manner of changing the remaining time of the second timer.

The processor 430 may change (or update) the existing information related to the idle state of the second link 332 to information related to the idle state of the second link 332 included in the medium synchronization information. The processor 430 may update the previously stored CCA status information with the CCA status information included in the medium synchronization information received through the first link 331, and may update the previously stored NAV configuration information with NAV configuration information included in the medium synchronization information received through the first link 331.

By updating the information related to the idle state of the second link 332, the processor 430 may determine the start time of the idle state of the second link 332 even in a situation in which data cannot be received through the second link 332, and may activate the second timer again from the determined time point for the second link 332.

After data transmission through the first link 331 is completed, the processor 430 may perform medium synchronization of the second link 332 or maintain the medium synchronization state based on the received medium synchronization information. The processor 430 may determine the time point when the second link 332 transitions to an idle state based on the updated information related to the idle state of the second link 332, and may activate the second timer at the time point of transition to the idle state. Upon confirming that the specified time (or changed time) has expired by using the second timer, the processor 430 may control the communication circuit 420 to transmit data to the external electronic device 320 through the second link 332.

Figure 6:
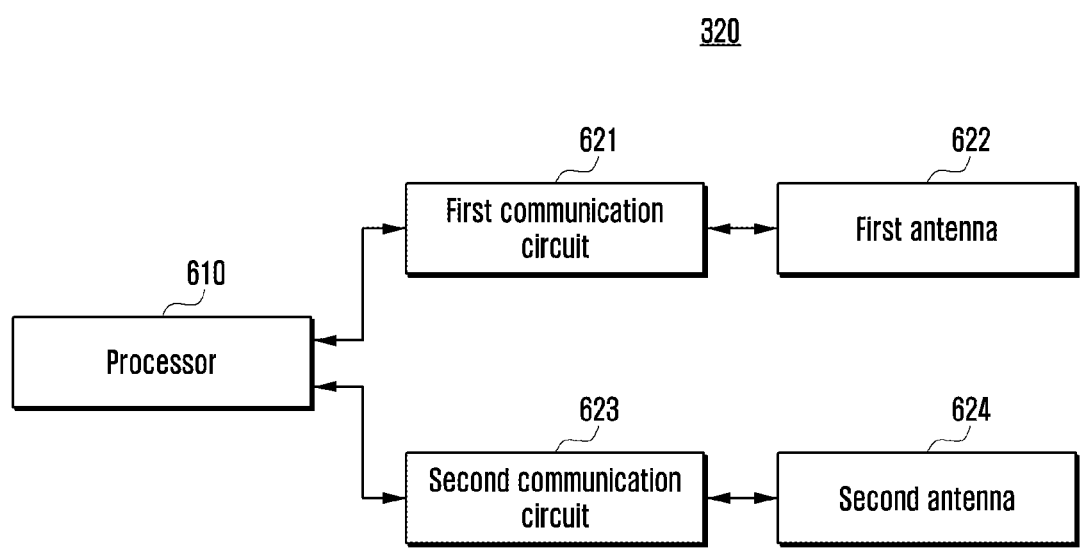
FIG. 6 is a block diagram illustrating an example configuration of an AP according to various embodiments.

FIG. 6 is a block diagram illustrating an example configuration of an external electronic device according to various embodiments of the disclosure.

According to various embodiments of the disclosure, the external electronic device (e.g., external electronic device 320 in FIG. 3) may include a processor 610 (e.g., processor 120 in FIG. 1), a first communication circuit 621 (e.g., third communication circuit 321 in FIG. 3), a first antenna 622 (e.g., third antenna 323 in FIG. 3), a second communication circuit 623 (e.g., fourth communication circuit 322 in FIG. 3), and a second antenna 624 (e.g., fourth antenna 324 in FIG. 3).

The external electronic device 320 may include a plurality of communication circuits including the first communication circuit 621 and the second communication circuit 623 to support multi-link operation. The first communication circuit 621 may transmit data to an external electronic device (e.g., electronic device 310 in FIG. 5) through the first link 331 or may receive data transmitted by the external electronic device 310 through the first link 331. The first communication circuit 621 may output or receive a signal of a frequency band corresponding to the first link 331 through the first antenna 622. The second communication circuit 623 may transmit data to the external electronic device 310 through the second link 332 or may receive data transmitted by the external electronic device 310 through the second link 332. The second communication circuit 623 may output or receive a signal of a frequency band corresponding to the second link 332 through the second antenna 624.

According to various embodiments of the disclosure, the frequency band of the first link 331 and the frequency band of the second link 333 may be different from each other. For example, the frequency band of the first link 331 may be 2.5 GHz, and the frequency band of the second link 332 may be 5 GHz or 6 GHz.

The processor 610 may be operably connected to the first communication circuit 621 and/or the second communication circuit 623, and control operations of the first communication circuit 621 and/or the second communication circuit 623.

The processor 610 may receive data from the electronic device 310 through the first link 331. The processor 610 may receive information indicating the operation mode of the electronic device 310 from the electronic device 310 during or before receiving data. According to an embodiment, the processor 610 may receive information indicating that the electronic device 310 operates in non-STR mode or EMLSR mode included in messages (e.g., information included in a specific field defined in the multi-link element (e.g., information indicating whether EMLSR is supported included in EML capabilities, NSTR (non-STR) bitmap included in the STA control field) exchanged while establishing the first link 331.

As the electronic device 310 operates in a specific mode, the processor 610 may generate medium synchronization information for the electronic device 310 to perform medium synchronization of the second link 332.

The medium synchronization information may include information about a second timer used for transmission of data through the second link 332. The information about the second timer may include information for changing a remaining time of the second timer and/or information related to the idle state of the second link 332.

The processor 610 may identify the period during which the second link 332 is in an idle state between the time point when data is received from the electronic device 310 through the first link 331 and the time point when the external electronic device 320 transmits medium synchronization information to the electronic device 310 through the first link 331. The processor 610 may generate information for changing the remaining time of the second timer including information about the period during which the second link 332 is in idle state (e.g., length of the period or number of slots corresponding to the period).

The processor 610 may identify the CCA status information and the NAV configuration at a time point before transmitting medium synchronization information, and generate information related to the idle state of the second link 332 including the updated CCA status information and NAV configuration.

The processor 610 may determine whether another external electronic device transmits data at a time point before transmitting medium synchronization information, determine, when the other external electronic device transmits data, the transmission completion time of the data based on a portion of the received data (e.g., PHY header), and update CCA status information. The updated CCA status information may include the remaining time until data transmission is completed, and may indicate that the second link 332 can be transitioned to the idle state after the remaining time expires.

The processor 610 may determine whether another external electronic device transmits data at a time point before transmitting medium synchronization information, determine, when the other external electronic device transmits data, the transmission completion time of the data based on a portion of the received data (e.g., MAC header), and update the NAV configuration. The updated NAV configuration may include the remaining time until data transmission is completed, and may indicate that the second link 332 can be transitioned to the idle state after the remaining time expires.

The processor 610 may control the first communication circuit 621 to transmit the medium synchronization information of the second link 332, including information for changing a remaining time of the second timer and/or information related to the idle state of the second link 332, to the electronic device 310 through the first link 331. The medium synchronization information of the second link 332 may be transmitted in various forms. For example and without limitation, the medium synchronization information of the second link 332 may be transmitted to the electronic device 310 through a message among a response message (ACK) for data received through the first link 331, a control message associated with the first link 331, a ready to send (RTS) message requesting data transmission through the first link 331, and a clear to send (CTS) message indicating that data transmission is possible through the first link 331.

Figure 7:
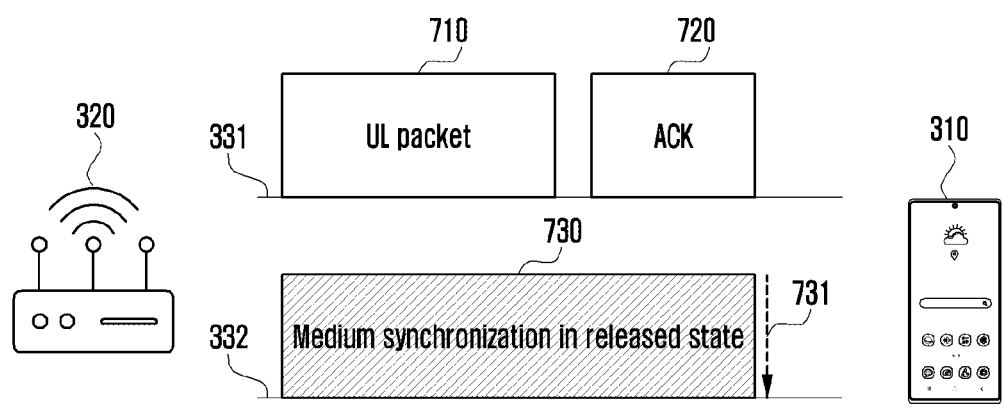
FIG. 7 is a diagram illustrating an example in which the electronic device performs medium synchronization of a second link by using medium synchronization information received through a first link according to various embodiments.

FIG. 7 is a diagram illustrating an example in which the electronic device performs medium synchronization of the second link by using medium synchronization information received through the first link according to various embodiments of the disclosure.

The electronic device (e.g., electronic device 310 in FIG. 5) is an electronic device that supports multi-link operation, and may transmit or receive data to or from an external electronic device (e.g., electronic device 600 in FIG. 6) through plural links including a first link (e.g., first link 331 in FIG. 3) and a second link (e.g., second link 332 in FIG. 3).

For implementation reasons, the electronic device 310 may transmit data to the external electronic device 320 by using a specific mode among the modes supported by multi-link operation. The specific mode may be one of non-STR mode and EMLSR mode as a mode in which reception of data through the second link 332 is not allowed while data is transmitted to the external electronic device 320 through the first link 331. The electronic device 310 may transmit information indicating operation in a specific mode to the external electronic device 320 through the first link 331.

The electronic device 310 may transmit data 710 to the external electronic device 320 through the first link 331. The electronic device 310 may be unable to receive data through the second link 332 while operating in the specific mode, in which case the medium synchronization of the second link 332 may be in released state. When the medium synchronization of the second link 332 is in released state, the electronic device 310 may fail to identify whether the second link 332 is in idle state or the time point when data can be transmitted through the second link 332.

While receiving the data 710, the external electronic device 320 may generate medium synchronization information for the electronic device 310 to perform medium synchronization of the second link 332.

The medium synchronization information may include, for example, information about the second timer used for transmission of data through the second link 332. The information about the second timer may include for example, information for changing the remaining time of the second timer and/or information related to the idle state of the second link 332.

The external electronic device 320 may identify the period during which the second link 332 is in idle state between the time point when data is received from the electronic device 310 through the first link 331 and the time point when the external electronic device 320 transmits medium synchronization information to the electronic device 310 through the first link 331. The external electronic device 320 may generate information for changing the remaining time of the second timer including information about the period during which the second link 332 is in an idle state (e.g., length of the period or number of slots corresponding to the period).

The external electronic device 320 may identify the CCA status information and/or the NAV configuration at a time point before transmitting medium synchronization information, and generate information related to the idle state of the second link 332 including the updated CCA status information and/or NAV configuration.

The external electronic device 320 may determine whether another external electronic device transmits data at a time point before transmitting medium synchronization information, determine, when the other externalelectronic device transmits data, the transmission completion time of the data based on a portion of the received data (e.g., PHY header), and update CCA status information. The other external electronic device may an external electronic device transmitting or receiving the data to the electronic device 310. The updated CCA status information may include the remaining time until data transmission is completed, and may indicate that the second link 332 can be transitioned to an idle state after the remaining time expires.

The external electronic device 320 may determine whether another external electronic device transmits data at a time point before transmitting medium synchronization information, determine, when the other external electronic device transmits data, the transmission completion time of the data based on a portion of the received data (e.g., MAC header), and update the NAV configuration. The updated NAV configuration may include the remaining time until data transmission is completed, and may indicate that the second link 332 can be transitioned to idle state after the remaining time expires.

The external electronic device 320 may transmit the medium synchronization information of the second link 332, including information for changing the remaining time of the second timer and/or information related to the idle state of the second link 332, to the electronic device 310 through the first link 331. Although the medium synchronization information of the second link 332 is shown in FIG. 7 as being included in a response message 720 indicating reception of the data 710, the medium synchronization information of the second link 332 may be transmitted in various forms. For example and without limitation, the medium synchronization information of the second link 332 may be transmitted to the electronic device 310 through a message among a response message 720 for data received through the first link 331, a control message associated with the first link 331, a ready to send (RTS) message requesting data transmission through the first link 331, and a clear to send (CTS) message indicating that data transmission is possible through the first link 331.

The electronic device 310 may receive medium synchronization information of the second link 332 through the response message 720 and perform (or maintain) medium synchronization of the second link 332.

The electronic device 310 may change the remaining time of the second timer by subtracting the time value included in the medium synchronization information from the remaining time of the second timer, and may perform (or maintain) medium synchronization of the second link 332 by changing the remaining time of the second timer.

The electronic device 310 may change (or update) the existing information related to the idle state of the second link 332 to information related to the idle state of the second link 332 included in the medium synchronization information. The electronic device 310 may update the previously stored CCA status information with the CCA status information included in the medium synchronization information received through the first link 331, and may update the previously stored NAV configuration information with NAV configuration information included in the medium synchronization information received through the first link 331.

By updating the information related to the idle state of the second link 332, the electronic device 310 may determine the start time of the idle state of the second link 332 even in a situation where data cannot be received through the second link 332, and may activate the timer again from the determined time point for the second link 332.

Figure 8:
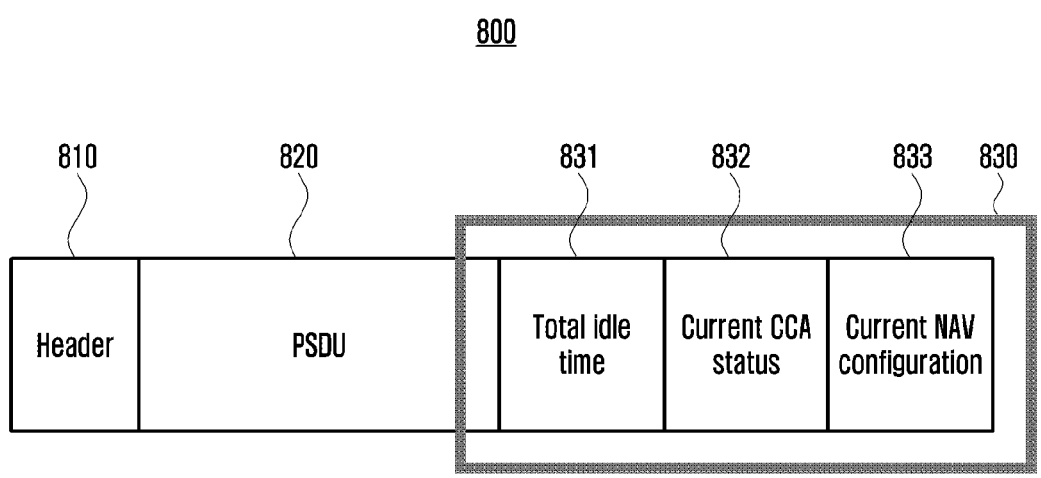
FIG. 8 is a diagram illustrating an example structure of a frame including information for the electronic device to perform medium synchronization of a second link according to various embodiments.

FIG. 8 is a diagram illustrating an example structure of a frame including information for the electronic device to perform medium synchronization of a second link according to various embodiments of the disclosure.

A frame 800 including information for performing medium synchronization of the second link may include: a header 810 including various fields such as a field related to an encoding scheme (e.g., orthogonal frequency-division multiplexing, OFDMA) of data through the second link 332 and a field indicating the length of the frame 800; a packet service data unit (PSDU) 820 including data to be transmitted; and medium synchronization information 830.

The medium synchronization information 830 may include a field 831 indicating the idle period of the second link 332, a CCA status field 832, and/or a NAV configuration field 833.

The field 831 indicating the idle period of the second link 332 may include the period during which the second link 332 is in idle state between the time point when the external electronic device 320 receives data through the first link 331 and the time point when the external electronic device 320 transmits medium synchronization information to the electronic device 310 through the first link 331.

The CCA status field 832 may include a transmission completion time of data in a situation where another external electronic device transmits data through the second link 332.

The NAV configuration field 833 is a field including information for determining whether the second link 332 is logically in idle state, and may include a time point at which whether the second link 332 is in idle state can be determined.

An electronic device (e.g., electronic device 310 in FIG. 5) according to various embodiments of the disclosure may include: at least one antenna (e.g., antenna 410 in FIG. 5); a communication circuit (e.g., communication circuit 420 in FIG. 5) electrically connected to the antenna 410 and configured to transmit and receive data through a first link (e.g., first link 331 in FIG. 4B) and/or second link (e.g., second link 332 in FIG. 4B) established between an external electronic device (e.g., external electronic device 320 in FIG. 4B) and the electronic device 310; and a processor (e.g., processor 430 in FIG. 5) operably connected to the communication circuit 420, wherein the processor 430 may be configured to: receive medium synchronization information of the second link 332 through the first link 331 while transmitting data to the external electronic device 320 through the first link 331; and perform synchronization of the second link 332 based on the medium synchronization information.

In the electronic device 310 according to various embodiments of the disclosure, the processor 430 may be configured to control the communication circuit 420 to receive the medium synchronization information through the first link 331 when operating in an operation mode in which data reception through the second link 332 is not allowed while data is transmitted through the first link 331.

In the electronic device 310 according to various embodiments of the disclosure, the processor 430 may be configured to control the communication circuit 420 to transmit information about the operation mode to the external electronic device 320.

In the electronic device 310 according to various embodiments of the disclosure, the medium synchronization information may include information about a timer for medium synchronization of the second link 332.

In the electronic device 310 according to various embodiments of the disclosure, the processor 430 may be configured to perform medium synchronization of the second link 332 by changing the remaining time of the timer or setting a restart time of the timer based on the information about the timer.

In the electronic device 310 according to various embodiments of the disclosure, the information about the timer may include information for changing the remaining time of the timer and information for determining a restart time of the timer.

In the electronic device 310 according to various embodiments of the disclosure, the information for changing the remaining time of the timer may include the period during which the second link 332 is in an idle state between the time point when data is transmitted to the external electronic device 320 through the first link 331 and the time point when the medium synchronization information is transmitted to the electronic device 310.

In the electronic device 310 according to various embodiments of the disclosure, the processor 430 may be configured to perform medium synchronization of the second link 332 by subtracting the period from the remaining time of the counter.

In the electronic device 310 according to various embodiments of the disclosure, the processor 430 may be configured to determine the restart time of the counter based on the information for determining the restart time of the timer.

An electronic device (e.g., external electronic device 320 in FIG. 4B) according to various embodiments of the disclosure may include: at least one antenna (e.g., first antenna 622, second antenna 624 in FIG. 6); a communication circuit (e.g., first communication circuit 621 and/or second communication circuit 623 in FIG. 6) electrically connected to the antenna 622 or 624 and configured to transmit and receive data through a first link (e.g., first link 331 in FIG. 4B) and/or second link (e.g., second link 332 in FIG. 4B) established between an external electronic device (e.g., electronic device 310 in FIG. 4B) and the electronic device 320; and a processor (e.g., processor 610 in FIG. 6) operably connected to the communication circuit 621 or 623, wherein the processor 610 may be configured to: generate medium synchronization information of the second link 332 while receiving data from the external electronic device 310 through the first link 331; and control, upon completion of reception of the data, the communication circuit 621 or 623 to transmit the medium synchronization information of the second link 332 to the external electronic device 310 through the first link 331, and wherein the medium synchronization information may include information about a timer for medium synchronization of the second link 332.

In the electronic device 320 according to various embodiments of the disclosure, the processor 610 may be configured to: receive information indicating that the external electronic device 320 operates in an operation mode where data reception through the second link 332 is not allowed while transmitting data to the electronic device 320 through the first link 331; and transmit, in response to receiving the information, medium synchronization information of the second link 332 through the first link 331.

In the electronic device 320 according to various embodiments of the disclosure, the information about the timer may include information for changing the remaining time of the timer and information for determining a restart time of the timer.

In the electronic device 320 according to various embodiments of the disclosure, the processor 610 may be configured to: identify the period during which the second link 332 is in idle state between the time point when data is transmitted to the external electronic device 310 through the first link 331 and the time point when the medium synchronization information is transmitted to the electronic device 320; and generate information for changing the remaining time of the timer based on the identified period.

In the electronic device 320 according to various embodiments of the disclosure, the processor 610 may be configured to generate information for determining the restart time of the timer based on the length of a frame transmitted through the second link 332 to another external electronic device.

Figure 9:
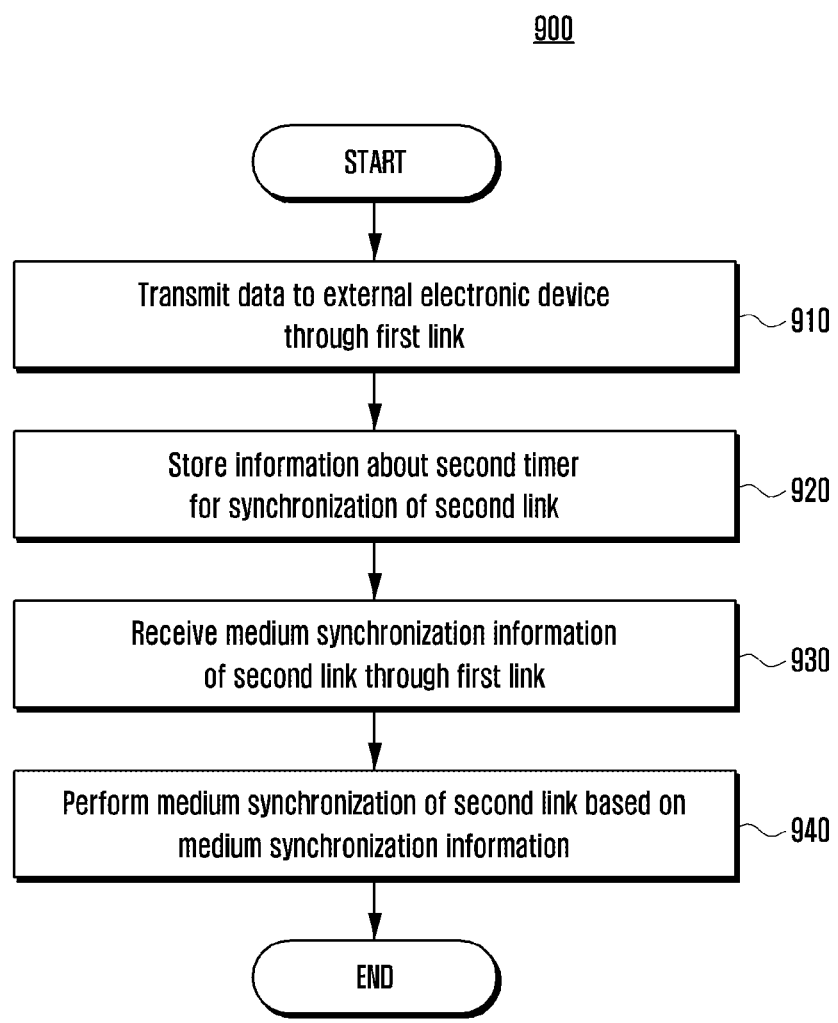
FIG. 9 is a flowchart illustrating an example method of operating an electronic device according to various embodiments.

FIG. 9 is a flowchart illustrating an example method of operating an electronic device according to various embodiments of the disclosure.

At operation 910, the electronic device (e.g., electronic device 310 in FIG. 5) may transmit data to an external electronic device (e.g., electronic device 320 in FIG. 6) through a first link (e.g., first link 331 in FIG. 3).

The electronic device (e.g., electronic device 310 in FIG. 5) is an electronic device that supports multi-link operation, and may transmit or receive data to or from an external electronic device (e.g., electronic device 320 in FIG. 6) through plural links including a first link (e.g., first link 331 in FIG. 3) and a second link (e.g., second link 332 in FIG. 3).

For implementation reasons, the electronic device 310 may transmit data to the external electronic device 320 by using a specific mode among the modes supported by multi-link operation. The specific mode may be one of non-STR mode and EMLSR mode as a mode in which reception of data through the second link 332 is not allowed while data is transmitted to the external electronic device 320 through the first link 331. The electronic device 310 may transmit information indicating operation in specific mode to the external electronic device 320 through the first link 331.

The electronic device 310 may be unable to receive data through the second link 332 while operating in the specific mode, in which case the medium synchronization of the second link 332 may be in released state. When the medium synchronization of the second link 332 is in released state, the electronic device 310 may fail to identify whether the second link 332 is in an idle state or the time point when data can be transmitted through the second link 332.

At operation 920, the electronic device 310 may store information about a second timer for synchronization of the second link (e.g., second link 332 in FIG. 3) in the memory (e.g., memory 130 in FIG. 1).

While operating in specific mode, the electronic device 310 may store information on the second timer used for data transmission through the second link 332 in the memory (e.g., memory 130 in FIG. 1). The information on the second timer may include the remaining time of the second timer (e.g., like the remaining time 416-b in FIG. 4A) for checking whether a specified time has expired. While operating in specific mode, the processor 430 may store information related to the idle state of the second link 332 (e.g., CCA status or NAV configuration) in the memory 130.

At operation 930, the electronic device 310 may receive medium synchronization information of the second link 332 through the first link 331.

The medium synchronization information may include information about the second timer used for transmission of data through the second link 332. The information about the second timer may include information for changing the remaining time of the second timer and/or information related to the idle state of the second link 332.

The external electronic device 320 may transmit the medium synchronization information of the second link 332, including information for changing the remaining time of the second timer and/or information related to the idle state of the second link 332, to the electronic device 310 through the first link 331.

The medium synchronization information of the second link 332 may be transmitted in various forms. For example and without limitation, the medium synchronization information of the second link 332 may be transmitted to the electronic device 310 through a message among a response message (ACK) for data received through the first link 331, a control message associated with the first link 331, a ready to send (RTS) message requesting data transmission through the first link 331, and a clear to send (CTS) message indicating that data transmission is possible through the first link 331.

At operation 940, the electronic device 310 may perform medium synchronization of the second link based on the medium synchronization information.

The electronic device 310 may change the remaining time of the second timer by subtracting the time value included in the medium synchronization information from the remaining time of the second timer, and may perform (or maintain) medium synchronization of the second link 332 by changing the remaining time of the second timer.

The electronic device 310 may change (or update) the existing information related to the idle state of the second link 332 to information related to the idle state of the second link 332 included in the medium synchronization information. The electronic device 310 may update the previously stored CCA status information with the CCA status information included in the medium synchronization information received through the first link 331, and may update the previously stored NAV configuration information with NAV configuration information included in the medium synchronization information received through the first link 331.

By updating the information related to the idle state of the second link 332, the electronic device 310 may determine the start time of the idle state of the second link 332 even in a situation where data cannot be received through the second link 332, and may activate the timer again from the determined time point for the second link 332.

Figure 10:
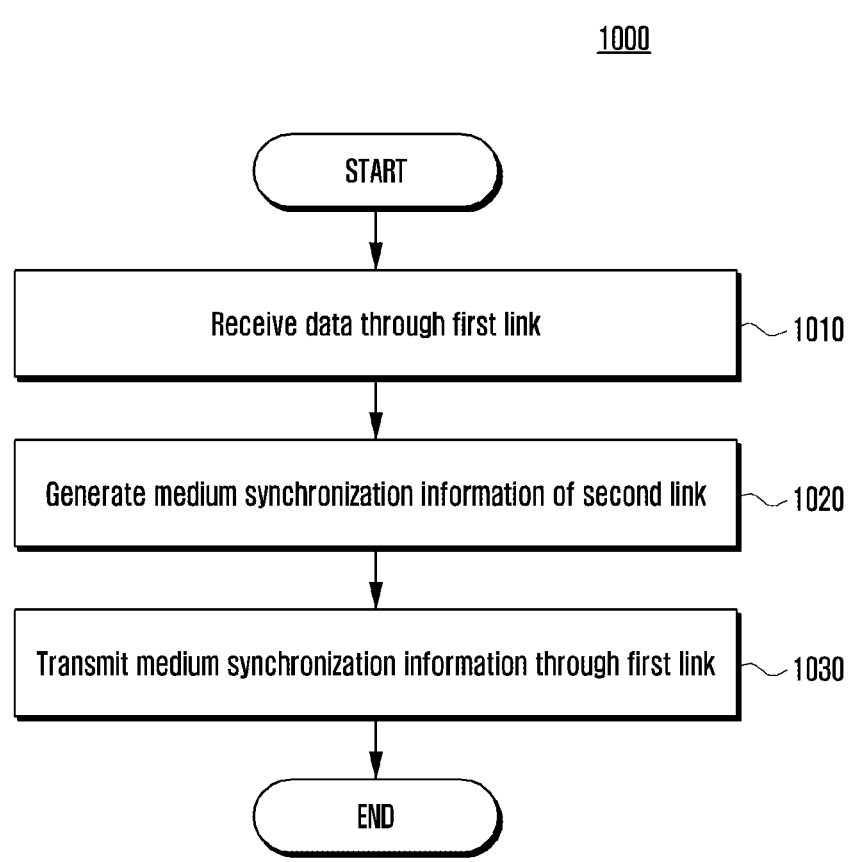
FIG. 10 is a flowchart illustrating an example method of operating an electronic device according to various embodiments.

FIG. 10 is a flowchart illustrating an example method of operating an electronic device according to various embodiments of the disclosure.

At operation 1010, the electronic device (e.g., external electronic device 320 in FIG. 6) may receive data from an external electronic device (e.g., electronic device 310 in FIG. 5) through the first link (e.g., first link 331 in FIG. 3).

At operation 1020, the electronic device 320 may generate medium synchronization information of the second link (e.g., second link 332 in FIG. 3).

The medium synchronization information may include information about the second timer used for transmission of data through the second link 332. The information about the second timer may include information for changing the remaining time of the second timer and/or information related to the idle state of the second link 332.

The electronic device 320 may identify the period during which the second link 332 is in idle state between the time point when data is received from the external electronic device 310 through the first link 331 and the time point when the electronic device 320 transmits medium synchronization information to the external electronic device 310 through the first link 331. The electronic device 320 may generate information for changing the remaining time of the second timer including information about the period during which the second link 332 is in an idle state (e.g., length of the period or number of slots corresponding to the period).

The electronic device 320 may identify the CCA status information and the NAV configuration at a time point before transmitting medium synchronization information, and generate information related to the idle state of the second link 332 including the updated CCA status information and NAV configuration.

The electronic device 320 may determine whether another external electronic device transmits data at a time point before transmitting medium synchronization information, determine, when the other external electronic device transmits data, the transmission completion time of the data based on a portion of the received data (e.g., PHY header), and update CCA status information. The updated CCA status information may include the remaining time until data transmission is completed, and may indicate that the second link 332 can be transitioned to idle state after the remaining time expires.

The electronic device 320 may determine whether another external electronic device transmits data at a time point before transmitting medium synchronization information, determine, when the other external electronic device transmits data, the transmission completion time of the data based on a portion of the received data (e.g., MAC header), and update the NAV configuration. The updated NAV configuration may include the remaining time until data transmission is completed, and may indicate that the second link 332 can be transitioned to idle state after the remaining time expires.

At operation 1030, the electronic device 320 may transmit the medium synchronization information to the external electronic device 310 through the first link 331.

The electronic device 320 may transmit the medium synchronization information of the second link 332, including information for changing the remaining time of the second timer and/or information related to the idle state of the second link 332, to the external electronic device 310 through the first link 331. The medium synchronization information of the second link 332 may be transmitted in various forms. For example and without limitation, the medium synchronization information of the second link 332 may be transmitted to the electronic device 310 through a message among a response message 720 for data received through the first link 331, a control message associated with the first link 331, a ready to send (RTS) message requesting data transmission through the first link 331, and a clear to send (CTS) message indicating that data transmission is possible through the first link 331.

An operation method of an electronic device (e.g., electronic device 310 in FIG. 5) according to various embodiments of the disclosure may include: receiving, in a state of transmitting data through a first link (e.g., first link 331 in FIG. 4B) established between an external electronic device (e.g., external electronic device 320 in FIG. 4B) and the electronic device 310, medium synchronization information of a second link (e.g., second link 332 in FIG. 4B); and performing synchronization of the second link 332 based on the medium synchronization information.

In the operation method of the electronic device 310 according to various embodiments of the disclosure, receiving medium synchronization information of a second link 332 may include receiving the medium synchronization information through the first link 331 when operating in an operation mode in which data reception through the second link 332 is not allowed while data is transmitted through the first link 331.

In the operation method of the electronic device 310 according to various embodiments of the disclosure, the medium synchronization information may include information about a timer for medium synchronization of the second link 332.

In the operation method of the electronic device 310 according to various embodiments of the disclosure, the information about the timer may include information for changing the remaining time of the timer and information for determining a restart time of the timer.

In the operation method of the electronic device 310 according to various embodiments of the disclosure, the information for changing the remaining time of the timer may include the period during which the second link 332 is in idle state between the time point when data is transmitted to the external electronic device 320 through the first link 331 and the time point when the medium synchronization information is transmitted to the electronic device 310, and performing synchronization of the second link 332 may include performing medium synchronization of the second link 332 by subtracting the period from the remaining time of the counter.

In the operation method of the electronic device 310 according to various embodiments of the disclosure, performing synchronization of the second link 332 may include determining the restart time of the counter based on the information for determining the restart time of the timer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one antenna;
a communication circuit electrically connected to the at least one antenna; and
a processor operably connected to the communication circuit, wherein the at least one processor is configured, individually or collectively, to:
establish via the communication circuit a multi-link operation in which data is transmitted and/or received through plural data links between the electronic device and an external electronic device, the plural data links including a first link and a second link for transmitting and receiving data between the electronic device and the external electronic device; and in an operation mode of the electronic device, during the multi-link operation, in which data reception through the second link is not allowed while data is transmitted through the first link:
receive, in a state of transmitting data to the external electronic device through the first link, medium synchronization information of the second link through the first link, wherein the medium synchronization information includes timer information about a timer for medium synchronization of the second link, wherein the timer information includes first information for changing a remaining time of the timer; and
perform synchronization of the second link based on the medium synchronization information.

2. The electronic device of claim 1, wherein the at least one processor is configured, individually or collectively, to control the communication circuit to transmit information about the operation mode to the external electronic device.

3. The electronic device of claim 1, wherein the at least one processor is configured, individually or collectively, to perform medium synchronization of the second link by changing a remaining time of the timer or setting a restart time of the timer, based on the timer information.

4. The electronic device of claim 1, wherein the timer information further includes second information for determining a restart time of the timer.

5. The electronic device of claim 4, wherein the first information includes a period during which the second link is in an idle state between a time point when data is transmitted to the external electronic device through the first link and a time point when the medium synchronization information is transmitted to the electronic device.

6. The electronic device of claim 5, wherein the at least one processor is configured, individually or collectively, to perform medium synchronization of the second link by subtracting the period from the remaining time of the timer.

7. The electronic device of claim 4, wherein the at least one processor is configured, individually or collectively, to determine the restart time of the timer based on the second information.

8. A method of operating an electronic device, the method comprising:
establishing a multi-link operation in which data is transmitted and/or received through plural data links between the electronic device and an external electronic device, the plural data links including a first link and a second link for transmitting and receiving data between the electronic device and the external electronic device; and
in an operation mode of the electronic device, during the multi-link operation, in which data reception through the second link is not allowed while data is transmitted through the first link:
receiving, in a state of transmitting data through a first link established between an external electronic device and the electronic device, medium synchronization information of a second link through the first link, wherein the medium synchronization information includes timer information about a timer for medium synchronization of the second link, wherein the timer information includes first information for changing a remaining time of the timer; and
performing synchronization of the second link based on the medium synchronization information.

9. The method of claim 8, wherein the timer information further includes second information for determining a restart time of the timer.

10. The method of claim 9, wherein:
the first information includes a period during which the second link is in an idle state between a time point when data is transmitted to the external electronic device through the first link and a time point when the medium synchronization information is transmitted to the electronic device; and
the method comprises performing medium synchronization of the second link by subtracting the period from the remaining time of the timer.

11. The method of claim 9, comprising determining the restart time of the timer based on the second information.

12. An electronic device comprising:
at least one antenna;
a communication circuit electrically connected to the at least one antenna; and
at least one processor operably connected to the communication circuit, wherein the at least one processor is configured, individually or collectively, to:
establish via the communication circuit a multi-link operation in which data is transmitted and/or received through plural data links between the electronic device and an external electronic device, the plural data links including a first link and a second link; and
in an operation mode of the external electronic device, during the multi-link operation, in which data reception through the second link is not allowed while data is transmitted through the first link:
generate, in a state of receiving data from the external electronic device through the first link, medium synchronization information of the second link, wherein the medium synchronization information includes timer information about a timer for medium synchronization of the second link, wherein the timer information includes first information for changing a remaining time of the timer; and
control, upon completion of receiving of the data, the communication circuit to transmit the medium synchronization information of the second link to the external electronic device through the first link.

13. The electronic device of claim 12, wherein the at least one processor is configured, individually or collectively, to:
receive information indicating that the external electronic device operates in the operation mode in which data reception through the second link is not allowed while data is transmitted through the first link; and
transmit, in response to receiving the information, the medium synchronization information of the second link through the first link.

14. The electronic device of claim 12, wherein the timer information further includes second information for determining a restart time of the timer.

15. The electronic device of claim 14, wherein the at least one processor is configured, individually or collectively, to:
identify a period during which the second link is in an idle state between a time point when data is transmitted to the external electronic device through the first link and a time point when the medium synchronization information is transmitted to the electronic device; and generate the first information based on the identified period.

16. The electronic device of claim 14, wherein the at least one processor is configured, individually or collectively, to generate information for determining the restart time of the timer based on a length of a frame transmitted through the second link to another external electronic device.

\* \* \* \* \*